United States Patent
Koga et al.

(10) Patent No.: US 12,437,953 B2
(45) Date of Patent: Oct. 7, 2025

(54) CATHODE MEMBER FOR ELECTRON BEAM GENERATION, AND METHOD FOR MANUFACTURING THE SAME

(71) Applicant: KOBELCO RESEARCH INSTITUTE, INC., Hyogo (JP)

(72) Inventors: Kenji Koga, Kobe (JP); Toshiaki Takagi, Kobe (JP); Fumiaki Kudo, Kobe (JP); Tatsuhiko Kusamichi, Kobe (JP)

(73) Assignee: KOBELCO RESEARCH INSTITUTE, INC., Hyogo (JP)

( * ) Notice: Subject to any disclaimer, the term of this patent is extended or adjusted under 35 U.S.C. 154(b) by 596 days.

(21) Appl. No.: 17/639,277

(22) PCT Filed: Aug. 28, 2020

(86) PCT No.: PCT/JP2020/032507
§ 371 (c)(1),
(2) Date: Feb. 28, 2022

(87) PCT Pub. No.: WO2021/044951
PCT Pub. Date: Mar. 11, 2021

(65) Prior Publication Data
US 2022/0336179 A1    Oct. 20, 2022

(30) Foreign Application Priority Data
Sep. 2, 2019   (JP) .............................. 2019-159587

(51) Int. Cl.
*B22F 3/10*    (2006.01)
*B22F 9/04*    (2006.01)
(Continued)

(52) U.S. Cl.
CPC ............... *H01J 1/146* (2013.01); *B22F 3/10* (2013.01); *B22F 9/04* (2013.01); *C22C 5/04* (2013.01);
(Continued)

(58) Field of Classification Search
CPC ....... C22C 5/04; C22C 1/047; B22F 2301/25; B22F 3/10; B22F 9/04
See application file for complete search history.

(56) References Cited

U.S. PATENT DOCUMENTS

| 5,773,922 A | 6/1998 | Lee et al. |
| 6,511,632 B1 | 1/2003 | Choi et al. |

(Continued)

FOREIGN PATENT DOCUMENTS

| JP | H04-272639 A | 9/1992 |
| JP | H11-354007 A | 12/1999 |

(Continued)

OTHER PUBLICATIONS

Sato Daisuke, Zhou Xiao, Nishida Maya et al. (Improvement of photoemission properties of Iridium Cerium compound for SuperKEKB injector linac, 14th Annual Meeting of Particle Accelerator Society of Japan, Aug. 1-3, 2017 (Year: 2017).*

(Continued)

*Primary Examiner* — Nicholas A Wang
(74) *Attorney, Agent, or Firm* — Studebaker Brackett PLLC

(57) ABSTRACT

The cathode member for electron beam generation of the present disclosure includes: 95% by area or more of a single phase or two phases of a compound composed of iridium and cerium. A total content of one or more subcomponents of metallic iridium and an oxide of one or more elements of iridium and cerium is 5% by area or less of the cathode member.

12 Claims, 7 Drawing Sheets

(51) Int. Cl.
  *C22C 5/04* (2006.01)
  *C30B 29/52* (2006.01)
  *H01J 1/146* (2006.01)
  *H01J 1/304* (2006.01)
  *H01J 1/34* (2006.01)
  *H01J 9/02* (2006.01)
  *H01J 9/04* (2006.01)
  *H01J 9/12* (2006.01)

(52) U.S. Cl.
  CPC .............. *C30B 29/52* (2013.01); *H01J 1/304* (2013.01); *H01J 1/34* (2013.01); *H01J 9/025* (2013.01); *H01J 9/042* (2013.01); *H01J 9/12* (2013.01); *B22F 2301/25* (2013.01)

(56) References Cited

U.S. PATENT DOCUMENTS

| | | |
|---|---|---|
| 2002/0153819 A1 | 10/2002 | Seo et al. |
| 2009/0110951 A1 | 4/2009 | Kuo et al. |
| 2015/0255240 A1 | 9/2015 | Ichimura et al. |

FOREIGN PATENT DOCUMENTS

| | | | |
|---|---|---|---|
| JP | 2002-527855 A | | 8/2002 |
| JP | 2002-260520 A | | 9/2002 |
| JP | 2009-107105 A | | 5/2009 |
| JP | 2011-124099 A | | 6/2011 |
| JP | 2015198034 A | * | 11/2015 |
| WO | 2014/057570 A1 | | 4/2014 |

OTHER PUBLICATIONS

H. Sugawara, T. Yamazaki, J. Itoh, M. Takashita, T. Ebihara, N. Kimura, P. Svoboda, R. Settai, Y. Onuki, H. Sato, S. Uji, H. Aoki, Single Crystal Growth and Electrical Properties of CeRh2 and CeIr2, Mar. 1994, Journal of the Physical Society of Japan vol. 63 No. 4 pp. 1502-1507 (Year: 1994).*

Daisuke Satoh et al.; "Characterization of binary Ce—Ir alloy photocathodes"; Japanese Journal of Applied Physics vol. 58; 2019; pp. 1-5; SIIB10.

H. Okamoto; "The Ce—Ir (Cerium-Iridium) System"; Journal of Phase Equilibria; vol. 12; No. 5; 1991; pp. 563-564.

The extended European search report issued by the European Patent Office on Jul. 28, 2023, which corresponds to European Patent Application No. 20861855.3-1103 and is related to U.S. Appl. No. 17/639,277.

Okamoto H. et al., "Ce (Cerium) Binary Alloy Phase Diagrams", Alloy Phase Diagrams, Apr. 27, 2016, pp. 251-260, ASM International, XP093064703, doi: 10.31399/asm.hb.v03.a0006154; *p. 254: Ce—Ir phase diagram*.

G. Kuznetsov, "High temperature cathodes for high current density", Nuclear Instruments and Methods in Physics Research A 340, 1994, pp. 204-208.

Takuya Natsui et al. "High Charge Low Emittance RF Gun for SuperKEKB", Proceedings of IPAC, 2012, pp. 1533-1535.

G. I. Kuznetsov, "IrCe Cathode for EBIS.", Journal of Physics: Conference Series 2, 2004, pp. 35-41.

S. E. Rozhkov et al., "Work Function of Iridium Alloys With Lanthanum, Cerium, Praseodymium, Neodymium, and Samarium", Brief messages, Received 1967, pp. 936-937 with its machine English translation.

Daisuke Satoh et al., "Improvement of Photoemission Properties of Iridium Ceriumcompound for SuperKEKB Injector Linac", Proceedings of PASJ 2017, WEP106, pp. 1165-1169 with its machine English translation.

Hitoshi Sugawara et al., "Single Crystal Growth and Electrical Properties of CeRh2 and CeIr2", Journal of the Physical Society of Japan, vol. 63, No. 4, Apr. 1994, pp. 1502-1507.

International Search Report issued in PCT/JP2020/032507; mailed Nov. 24, 2020.

T. Kusamichi et al., "Cold Crucible Melting for Alloys with Active and High Melting Point", Kobe Steel Engineering Reports, vol. 54, No. 1, Apr. 2004, pp. 108-112.

An Office Action mailed by China National Intellectual Property Administration on Dec. 26, 2023, which corresponds to Chinese Patent Application No. 202080060617.6 and is related to U.S. Appl. No. 17/639,277; with partial English language translation.

Daisuke Satoh et al., "Improvement of Photoemission Properties of Iridium Cerium Compound for SuperKEKB Injector Linac", Proceedings of the 14th Annual Meeting of Particle Accelerator Society of Japan, Aug. 1, 2017, pp. 1167-1168.

Hitoshi Sugawara et al., "Single Crystal Growth and Electrical Properties of CeRh2 and CeIr2", Journal of the Physical Society of Japan, Physical Society of Japan, vol. 63, No. 4, Apr. 1, 1994, pp. 1502-1507.

* cited by examiner (a)

(b)

(a)

(b)

(c)

(d)

CATHODE MEMBER FOR ELECTRON BEAM GENERATION, AND METHOD FOR MANUFACTURING THE SAME

TECHNICAL FIELD

The present disclosure relates to a cathode member for electron beam generation, and a method for manufacturing the same.

BACKGROUND ART

Cathode members for electron beam generation (negative electrodes, and electron guns) are classified into three main types, namely, the thermal electron emission, photoelectron emission, and field electron emission types according to the electron emission principle. Thermal electron guns utilizing the thermal electron emission are used in various devices and equipment such as electron microscopes and electron beam melting devices. Photoelectron guns of the photoelectron emission type utilize the photoelectric effect and are used in low-energy electron beam irradiation devices and non-destructive analyzers. Electron guns of the field electron emission type are used for field electron microscope.

Conventionally, tungsten (W), tantalum (Ta), and the like have been used as the material to form a cathode member for electron beam generation. In recent years, lanthanum hexaboride ($LaB_6$), which can achieve higher current density and longer life than tungsten and tantalum, has been used. Non-Patent Document 1 shows that since an iridium-cerium (Ir—Ce) based alloy has less evaporation loss when used in a high-temperature state as well as higher durability against corrosive gas than $LaB_6$, the Ir—Ce based alloy can be expected to extend the life of a cathode member for electron beam generation when used as the cathode member.

In addition to the above Non-Patent Document 1, Patent Documents 1 to 3, Non-Patent Document 2 and Non-Patent Document 3 also report that a cathode member made of the above Ir—Ce based alloy exhibits better characteristics than a conventional cathode member made of $LaB_6$ or the like, and that, for example, it also exhibits excellent performance under low vacuum and corrosive gas atmosphere.

Furthermore, Non-Patent Document 4 reports that the work function of an Ir—Ce based material is 2.57 eV (1,300 K), while Ir—La, Ir—Pr, Ir—Nd, Ir—Sm, etc., exhibit almost the same value. The above Non-Patent Document 1 reports that among Ir-rare earth element-based cathode materials, an Ir—Ce alloy-based cathode material has a smaller evaporation loss rate at the same current density than a cathode material using La and Pr which are other rare earth elements. Non-Patent Document 5 reports that $Ir_2Ce$ has the best characteristics among compositions of iridium-cerium based alloys.

Examples of the method for manufacturing the above Ir—Ce based alloy, which is used for a cathode member for electron beam generation, include the following methods. First, there is an arc melting+solidification method, in which metal as the raw material is melted by the arc melting method and then solidified, under an inert gas atmosphere. Another example of the method is an arc melting+sintering method, in which the solidified material obtained by the above arc melting+solidification method is pulverized, and the pulverized material is then sintered. A further example of the method is a mechanical alloying+sintering method, in which raw material powder is alloyed by a mechanical alloying method and then sintered.

Patent Document 4 shows the arc melting+sintering method. Specifically, the method includes the steps of: melting and mixing iridium-cerium raw material under an inert gas atmosphere by a melting method in which a water-cooled copper vessel is used as a melting crucible, solidifying the mixture, and then pulverizing it to fabricate a powder with a maximum length of 500 μm or less; and molding the resulting powder under a high-temperature and high-pressure condition, i.e., at a temperature between 800° C. and 1,500° C., inclusive, and a pressure of 10 MPa or higher. It is mentioned that through these steps, this method produces a cathode member in which the occurrence of defects such as cracks and chips is suppressed while maintaining the homogeneity of its component composition, thereby achieving a longer life.

There has recently been proposed a technology for manufacturing a solidified material of a single crystal Ir—Ce based alloy in a tetra arc furnace as shown in Non-Patent Document 6.

PRIOR ART DOCUMENT

Patent Document

Patent Document 1: U.S. Pat. No. 5,773,922
Patent Document 2: JP 2002-527855 W
Patent Document 3: JP 2002-260520 A
Patent Document 4: JP 2015-198034 A

Non-Patent Document

Non-Patent Document 1: Kuznetsov, "High temperature cathodes for high current density", Nuclear Instruments and Methods in Physics Research A340, 1994, pp. 204-208
Non-Patent Document 2: T. Natsui, M. Yoshida, et. al. "High Charge Low Emittance RF Gun for SUPERKEKB", Proc. IPAC, 2012, pp. 1533-1535
Non-Patent Document 3: G. I. Kuznetsov, "IrCe Cathode For EBIS", J. physics: Conference Series 2, 2004, pp. 35-41
Non-Patent Document 4: S. E. Rozhkov, O. K. Kulashev, and L. I. Dashevskaya, "WORK FUNCTION OF IRIDIUM ALLOYS WITH LANTHANUM, CERIUM, PRASEODYMIUM, NEODYMIUM, AND SAMARIUM", Brief messages, Received 1967, pp. 936-937
Non-Patent Document 5: D. C. Satoh et al., "High performance iridium cerium photocathode for SuperKEKB electron injector," Proceedings of PASJ2017, WEP106 (2017)
Non-Patent Document 6: H. Sugawara et al., "Single crystal growth and electrical properties of CeRh2 and CeIr2", J. J. Phys. Soc. Jpn. 63, pp. 1502-1507(1994).

DISCLOSURE OF THE INVENTION

Problems to be Solved by the Invention

The arc melting plus (+) solidification method tends to cause defects, cracks and the like during solidification. In contrast, the sintered material obtained by the arc melting+sintering method or mechanical alloying+sintering method mentioned in Patent Document 4 is denser than the solidified material and can suppress the occurrence of defects such as cracks and chips, thus achieving a longer life. However, in recent years, there has been a demand for cathode members for electron beam generation that can achieve a further improvement in the electron emission characteristics, particularly a further increase in the current density.

The present disclosure has been made in view of the foregoing circumstances, and an object of the present disclosure is to provide a cathode member for electron beam generation of a practical size which has excellent electron emission characteristics and can achieve high performance such as increased power of electron beams, and a method for manufacturing the same. The cathode member for electron beam generation of the present disclosure is hereinafter simply referred to as "cathode member".

Means for Solving the Problems

A first aspect of the present disclosure is directed to a cathode member for electron beam generation, including:
  95% by area or more of a single phase or two phases of a compound composed of iridium and cerium,
  wherein a total content of one or more subcomponents of metallic iridium and an oxide of one or more elements of iridium and cerium is 5% by area or less of the cathode member.

A second aspect of the present disclosure is directed to the cathode member for electron beam generation according to the first aspect, wherein the compound composed of iridium and cerium is a compound selected from a group consisting of $Ir_2Ce$, $Ir_3Ce$, $Ir_7Ce_2$, and $Ir_5Ce_2$.

A third aspect of the present disclosure is directed to the cathode member for electron beam generation according to the first or second aspect, wherein a size of the subcomponent is 50 μm or less in circular equivalent diameter.

A fourth aspect of the present disclosure is directed to the cathode member for electron beam generation according to the second or third aspect, wherein the single phase of $Ir_2Ce$, $Ir_3Ce$, $Ir_7Ce_2$, or $Ir_5Ce_2$ occupies 95% by area or more of the cathode member.

A fifth aspect of the present disclosure is directed to the cathode member for electron beam generation according to the second or third aspect, wherein the two phases of $Ir_2Ce$ and $Ir_3Ce$, $Ir_2Ce$ and $Ir_7Ce_2$, or $Ir_7Ce_2$ and $Ir_3Ce$ occupy 95% by area or more of the cathode member.

A sixth aspect of the present disclosure is directed to the cathode member for electron beam generation according to the first aspect, wherein the compound composed of iridium and cerium is made of a single phase of $Ir_2Ce$, $Ir_3Ce$, $Ir_7Ce_2$, or $Ir_5Ce_2$, and contains neither metallic iridium nor an oxide of one or more elements of iridium and cerium.

A seventh aspect of the present disclosure is directed to the cathode member for electron beam generation according to any one of the first to sixth aspects, wherein a crystal microstructure of the single phase is solidified in one direction or made of a single crystal.

An eighth aspect of the present disclosure is directed to a method for manufacturing the cathode member for electron beam generation according to any one of the first to seventh aspects, the method including:
  a melting step of melting a metallic cerium raw material and a metallic iridium raw material to obtain an ingot material;
  a pulverizing step of pulverizing the ingot material to obtain a pulverized material;
  a sintering step of sintering the pulverized material of the ingot material at a temperature of 1,400 to 1,600° C. and a pressure of 25 to 50 MPa to obtain a sintered material for fabrication of a crystalline body; and
  a crystalline body fabricating step of fabricating a crystalline body of a compound composed of iridium and cerium by a floating zone method using the sintered material for fabrication of the crystalline body.

A ninth aspect of the present disclosure is directed to the method for manufacturing a cathode member for electron beam generation according to the eighth aspect, the method further including:
  a crystalline body pulverizing step of pulverizing the crystalline body to obtain a pulverized material, after the crystalline body fabricating step; and
  a sintering step of sintering the pulverized material of the crystalline body at a temperature of 1,400 to 1,600° C. and a pressure of 25 to 50 MPa to obtain a sintered material.

Effects of the Invention

The present disclosure makes it possible to provide a cathode member for electron beam generation of a practical size which has excellent electron emission characteristics and can achieve high performance such as increased power of electron beams, and also to provide a method for manufacturing the same.

MODE FOR CARRYING OUT THE INVENTION

Figure 1:
FIG. 1 shows a photograph of the appearance of a crystalline body (cathode member) obtained in the Example.

The inventors conducted intensive research on the premise of using an Ir—Ce based material in order to realize a cathode member for electron beam generation of a practical size that has excellent electron emission characteristics, i.e., can enhance the current density more, and consequently can achieve high performance such as increased power of electron beams, and also to realize a method for manufacturing the same. As a result, it has been found that to this end, a single phase or two phases of a compound composed of iridium and cerium needs to occupy 95% by area or more of the cathode member. The present disclosure has realized a cathode member having the above microstructure with a total content of one or more subcomponents of metallic iridium and an oxide of one or more elements of iridium and cerium being 5% by area or less of the cathode member. Further, the present disclosure has been made as a method for manufacturing a cathode member on the assumption that a crystalline body of a compound composed of iridium and cerium is fabricated by a floating zone method. It is found that when raw material for use in the floating zone method is fabricated by the method of the present disclosure, it is possible to produce the cathode member of the practical size that suppresses defects, has excellent electron emission characteristics, and can achieve high performance such as increased power of electron beam. The cathode member for electron beam generation of the present disclosure will be described below in order.

First, the cathode member of the present disclosure has a compound composed of iridium and cerium as the main phase. As the compound composed of iridium and cerium, $Ir_5Ce$, $Ir_7Ce_2$, $Ir_3Ce$, $Ir_2Ce$, $Ir_4Ce_5$, $Ir_3Ce_5$, $Ir_3Ce_7$, $IrCe_3$, and $IrCe_4$ are listed in ascending order of the Ce concentration added to Ir. Among these, one or more compounds selected from $Ir_2Ce$, $Ir_3Ce$, $Ir_7Ce_2$, and $Ir_5Ce$ are preferable because they have a high melting point and are suitable for the cathode member for electron beam generation which is prone to high temperature atmosphere. Furthermore, among these four compounds, $Ir_2Ce$ is the most preferred because it has high thermodynamic stability and exhibits better electron emission characteristics as the Ce concentration becomes higher.

Therefore, when the compound composed of iridium and cerium which constitutes the cathode member is made up of a single phase, the compound composed of iridium and cerium is preferably $Ir_2Ce$, $Ir_3Ce$ $Ir_7Ce_2$, or $Ir_5Ce_2$, and most preferably $Ir_2Ce$. Alternatively, when the compound composed of iridium and cerium which constitutes the cathode member is made up of two phases, the compound composed of iridium and cerium preferably includes two kinds of compounds selected from the group consisting of $Ir_2Ce$, $Ir_3Ce$, $Ir_5Ce_2$, and $Ir_5Ce_2$, and it is more preferably a combination of $Ir_2Ce$ and $Ir_3Ce$, $Ir_2Ce$ and $Ir_7Ce_2$, or $Ir_7Ce_2$ and $Ir_3Ce$.

The cathode member for electron beam generation of the present disclosure can sufficiently exhibit excellent electron emission characteristics by including a single phase or two phases of the compound composed of iridium and cerium (Ir—Ce compound) at 95% by area or more. The proportion of the single phase or two phases of the compound composed of iridium and cerium in the entire cathode member is preferably 98% by area or more, more preferably 99.945% by area or more, still more preferably 99.99% by area or more, and yet more preferably 99.999% by area or more.

The proportion of the single phase or two phases of the compound composed of iridium and cerium can be evaluated by a microscopic observation photographs or X-ray diffraction method, as shown in the Examples below. In the microscopic observation, the difference in phase can be determined from a difference in contrast, and the area ratio of the single phase or two phases of the compound composed of iridium and cerium to the entire field of view may be determined.

Further, EDX analysis (Energy Dispersive X-ray spectrometry) can be performed to identify the phase components. In addition, by the X-ray diffraction method, peaks can be separated to conduct quantitative evaluation.

The cathode member of the present disclosure may contain substances other than the above Ir—Ce compound to the extent that they do not interfere with the electron emission characteristics. The substances may include one or more subcomponents which include metallic iridium and an oxide of one or more elements of iridium and cerium. The proportion of the subcomponent(s) is preferably 5% by area or less (inclusive of 0% by area) in total. From the viewpoint of realizing more excellent electron emission characteristics, the proportion of the above subcomponent(s) is more preferably 3% by area or less, and most preferably 0% by area, that is, the cathode member contains neither metallic iridium nor the oxide of one or more elements of iridium and cerium.

When the subcomponents are contained, the size of the subcomponent is preferably 50 µm or less in terms of circular equivalent diameter in order to ensure favorable electron emission characteristics more easily. In other words, the largest size of the subcomponent in the field of view when observed using the method mentioned in the Examples below is preferably restricted to 50 µm or less in terms of circular equivalent diameter. The size of the oxide is more preferably 30 µm or less in terms of circular equivalent diameter, and still more preferably 15 µm or less in terms of circular equivalent diameter. The size of the subcomponents is determined by the method described in the Examples below.

The cathode member of the present disclosure is preferably composed of a single phase of $Ir_2Ce$, $Ir_3Ce$, $Tr_7Ce_2$, or $Ir_5Ce_2$. In other words, preferably, the entire microstructure of the cathode member is occupied by the above single phase and contains neither metallic iridium nor the oxide of one or more elements of iridium and cerium. More preferably, the cathode member is composed of a single phase of $Ir_2Ce$, and contains neither metallic iridium nor the oxide of one or more elements of iridium and cerium.

In the cathode member of the present disclosure, the crystal microstructure of the single phase is preferably solidified in one direction or made of a single crystal. Along with the homogeneity of the component composition, the crystal orientation is aligned in one direction, thus promoting homogeneity of the crystal microstructure, which enables further improvement in the electron emission characteristics. The cathode member of the present disclosure is more preferably a single phase and single crystal of the compound composed of iridium and cerium (preferably $Ir_2Ce$, $Ir_3Ce$, $Ir_7Ce_2$, or $Ir_5Ce_2$, particularly preferably $Ir_2Ce$).

The cathode member of the present disclosure may have a maximum circular equivalent diameter of 5 mm or more on its cross-section perpendicular to the major axis direction in the shape of the cathode member. The cathode member is more suitable for applications where high current density is required, such as electron beam welders, for example. Specifically, for example, this cathode member can be used as a cathode member with higher heat resistance. The maximum circular equivalent diameter thereof may further be 7 mm or more, or even 10 mm or more. In the case of the cathode member manufactured by the floating zone method, the major axis direction is the same as the crystal growth direction in the floating zone method. When the shape of the cathode member is a shape that cannot define the major axis direction, such as a sphere shape, any direction can be used as the major axis direction.

[Manufacturing Method]

The method for manufacturing a cathode member will be described below. The method for manufacturing a cathode member for electron beam generation of the present disclosure includes:

a melting step of melting a metallic cerium raw material and a metallic iridium raw material to obtain an ingot material;

a pulverizing step of pulverizing the ingot material to obtain a pulverized material;

a sintering step of sintering the pulverized material in a high-temperature and high-pressure atmosphere to obtain a sintered material; and a crystalline body fabricating step of fabricating a crystalline body of a compound composed of iridium and cerium by a floating zone method using the sintered material. Each step of the manufacturing method of the present disclosure will be described below. The floating zone method may be hereinafter referred to as "FZ method".

In the method of the present disclosure, the crystalline body is fabricated by the floating zone (FZ) method as mentioned above. In the conventional FZ method, due to fine pores and variations in pore distribution and sintering density in a raw material rod used as the raw material, a supply of the raw material is not stable in the FZ method, causing the component composition of the crystalline body to easily become non-uniform, and making it difficult to obtain crystals aligned in the uniform direction.

In the present disclosure, the raw materials to be used in the FZ method, i.e., a raw material rod and a seed crystalline body, are prepared in the following way. The homogeneous sintered material with high sintering density that has been prepared by a method mentioned below is used as the raw material rod and seed crystalline body to perform the FZ method, which can obtain a crystal body that has its component composition homogenized and has a desired good quality crystal, preferably is made of a unidirectional solidified material or a single crystal.

[Fabrication of Sintered Material for Fabrication of Crystalline Body]
(Melting Step)

First, a metallic cerium raw material and a metallic iridium raw material are prepared. As these materials, commercially available raw materials may be used and directly melted as they are. In the present disclosure, the FZ method can remove impurities, and thus the concentration of impurities, such as oxygen, in the ingot material or sintered material to be used for the FZ method is not particularly specified. However, if necessary, the raw material may be subjected to the following pretreatment before being melted. An example of the pretreatment of the raw material includes mechanical removal of an altered part, such as an oxide film, which may be present in the metallic cerium raw material. Specifically, the above altered part can be ground and removed by using, for example, a metal file, router, grinder, nippers, or the like.

After the mechanical removal, pickling treatment and water rinsing treatment may be performed on the raw material. The acid used in the pickling treatment is not particularly limited and can be any acid that enables removal of the above surface altered layer. For example, the raw material is immersed in an aqueous acid solution, such as a nitric acid solution (at room temperature) in which nitric acid is diluted with water at the ratio of nitric acid:water (in volume)=1:6. After the pickling treatment, water rinsing treatment is preferably performed to remove the acid attached to cerium.

Meanwhile, the form of the metallic iridium raw material is not particularly limited. As shown in the Examples below, powdered metallic iridium may be used. When using powdered iridium, its average particle size can be in the range of 45 to 90 μm.

The metallic cerium raw material and the metallic iridium raw material are mixed together and melt under an inert gas atmosphere. Examples of the melting method include a plasma arc melting method and a cold crucible induction melting method. From the viewpoint of preventing ingot oxidation, the plasma arc melting method using high purity Ar gas is preferred. After the mixing and melting, for example, the mixture can be poured into a mold and solidified to obtain an ingot of Ir—Ce alloy as an ingot material.

(Pulverizing Step of Ingot Material)
The ingot material is pulverized. The ingot material may be cut by machining to the size of the raw material for pulverization as needed. If necessary, the altered parts of the raw material for pulverization may be removed by grinding or other processes before pulverization. The atmosphere for the pulverization is desirably not an atmospheric atmosphere, but an inert gas atmosphere such as argon, for example, because the raw material contains a large amount of cerium, which is an active element. The pulverization method is not particularly limited. For example, pulverization can be performed in a glove box filled with inert gas.

The size of the pulverized material is preferably in the range of, for example, 45 to 90 μm in average particle size. For example, in order to produce the crystalline body of the compound composed of iridium and cerium and satisfying the size and composition specified in the embodiment of the present invention by the FZ method mentioned below, it is preferable to use a dense raw material rod. Furthermore, in order to obtain this dense raw material rod, it is preferable to finely pulverize the above ingot material. However, if the above ingot material is pulverized extremely finely, the raw material becomes more susceptible to oxidation, and because of this, the size of the pulverized material is preferably within the above average particle size range.

(Sintering Step of Pulverized Material of Ingot Material)
The above pulverized material is filled into a sintering mold, and then sintered by a discharge plasma sintering method under an inert atmosphere such as argon to fabricate a sintered material for fabrication of a crystalline body, in other words, a sintered material for a raw material rod and seed crystalline body, for example, which are to be used in the FZ method. The conditions of the above discharge plasma sintering method are preferably as follows: temperature: 1,400 to 1,600° C., and pressure: 25 to 50 MPa. More preferably, the conditions are as follows: temperature: 1,500 to 1,550° C., and pressure: 45 to 50 MPa. Instead of the above discharge plasma sintering method, a hot press sintering method can also be used for sintering.

[Crystalline Body Fabrication Step]
In the embodiment of the present invention, a crystalline body of a compound composed of iridium and cerium is fabricated by the FZ method using the raw material rod and seed crystalline body obtained from the sintered material. Since the method does not use a crucible, there is no concern about contamination of impurities from the crucible. In addition, the raw material rod and the seed crystalline body can be subjected to a high temperature regardless of the heat resistance temperature of the crucible.

As the FZ method, either a high-frequency heating type method or a focused light heating type method can be used. The use of the raw material rod as the raw material includes two patterns, one in which a seed crystalline body is placed on top of the raw material rod to control the orientation along with the raw material rod, and the other in which only the raw material rod is used without placing the seed crystalline body. Hereinafter, a method of manufacturing a crystalline body by the focused light heating type method using the raw material rod and the seed crystalline body will be described as an example of the FZ method.

An example of a device used to perform the FZ method is a focused heating floating zone (FZ) growth device equipped with a xenon lamp. The raw material rod and the seed crystalline body are fixed to the upper and lower shafts of the device, respectively, via a fixing holder, and inert gas is introduced into the FZ growth device. As the inert gas, for example, high-purity argon gas is introduced at a flow rate of 1 to 10 L/min. The seed crystalline body and its surrounding parts are melted by the focused heating to form an initial melted zone, and then a single crystal is grown or solidified in one direction there at a growth rate of 0.1 to 50 mm/hr, which can produce a crystalline body. It is noted that the rotational speed of the upper and lower shafts can be set to 1 to 100 rpm.

If necessary, the above crystalline body may be pulverized and then sintered as mentioned below. This method can produce the cathode member that has a higher strength and can withstand long-term practical use.

[Pulverization Step of Crystalline Body]

The crystalline body obtained in the above crystalline body manufacturing step is pulverized to produce a pulverized material made of the crystalline body. The atmosphere for the pulverization is not an atmospheric atmosphere, but is desirably an inert gas atmosphere such as argon, for example, because the raw material contains a large amount of cerium, which is an active element. The pulverization method is not particularly limited. For example, pulverization can be performed in a glove box filled with inert gas. The grain size of the pulverized material is preferably in the range of, for example, 45 to 90 μm in average particle size.

[Sintering Step of Pulverized Material of Crystalline Body]

The pulverized material of the crystalline body is sintered in a high-temperature and high-pressure atmosphere to produce the sintered material. Specifically, the above pulverized material is filled into a sintering mold, and then sintered by the discharge plasma sintering method under an inert atmosphere such as argon to produce a sintered material. The conditions of the above discharge plasma sintering method are preferably as follows: temperature: 1,400 to 1,600° C., and pressure: 25 to 50 MPa. Instead of the above discharge plasma sintering method, the hot press sintering method can also be used for sintering.

After the fabrication of the crystalline body or after sintering the pulverized material of the crystalline body, the crystalline body or pulverized material can be subjected to machining or the like as needed so as to have the shape of the cathode member.

Examples

Hereinafter, the embodiments of the present invention will be described in more detail with reference to examples. The present disclosure is not limited by the following examples, and may be implemented with appropriate changes to the extent that it may meet the purposes mentioned above and below, all of which are included in the technical scope of the present disclosure.

1. Fabrication of Sintered Material for Fabrication of Crystalline Body

As the raw material for manufacturing the crystalline body used in the FZ method, a seed crystalline body and a raw material rod were produced as follows.

1-1. Fabrication of Ingot Material (Ingot)

Commercially available metallic cerium (purity of 3N) and high-purity iridium powder (purity of about 3N), which were stored in oil, were used to produce an ingot material for a cathode member for electron beam generation. First, the inventors used a router to grind the surface of the metallic cerium raw material to thereby remove altered parts such as an oxide film. Thereafter, the pickling treatment was performed. In the pickling treatment, the cerium raw material after the surface grinding was immersed in a nitric acid solution diluted at nitric acid:water (volume ratio)=1:6 to remove a residual oxide film or the like. The above immersion was performed for several seconds per piece of metallic cerium with a diameter of about several millimeters. After the pickling treatment, the acid adhering to the cerium raw material was removed by the water rinsing treatment using pure water, so that the metallic cerium raw material was prepared.

The above pre-treated metallic cerium raw material and the above iridium powder were blended such that the cerium content in the entire raw material was 26.7% by mass with the remainder being iridium. A mixture of these materials was melted by the plasma arc melting method using high-purity Ar gas and poured into the mold to obtain an ingot (ingot material) of an iridium-cerium based alloy.

1-2. Pulverizing Step of Ingot Material and Sintering Step of Pulverized Material The ingot was cut to the size of 10 mm in diameter and 2 to 3 mm in length by machining, and its processed surface was subjected to polishing treatment, thereby removing the surface oxide film and the altered part. The ingot was then manually crushed under an inert gas atmosphere to obtain fine powder with an average particle size of 45 μm to 90 μm.

Then, the above fine powder was filled into a graphite mold and subjected to the discharge plasma sintering under the following conditions: temperature: 1,400 to 1,600° C., and pressure: 25 to 50 MPa. Consequently, a sintered material with a size of 8 mm or more in diameter was obtained. Afterwards, the surface grinding was performed on the sintered material to make the seed crystalline body and raw material rod.

2. Crystalline Body Fabricating Step

A single crystal was grown or solidified in one direction using a focused heating floating zone (FZ) growth device equipped with a xenon lamp. Specifically, the raw material rod and seed crystalline body were fixed to the upper and lower shafts of the FZ growth device, respectively, via the fixing holder. Then, argon gas of high purity was introduced into the FZ growth device at a flow rate of 5 L/min. Subsequently, the seed crystalline body and its surrounding parts were melted by the focused heating to form an initial melted zone, and then a single crystal was grown or solidified in one direction there at a growth rate of 10 mm/hr, which produced a crystalline body. It is noted that the rotational speed of the upper and lower shafts was set to 20 rpm.

FIG. 1 shows a photograph of the appearance of the obtained crystalline body (cathode member). In FIG. 1, the left direction of the photograph indicates the crystal growth direction. The maximum circular equivalent diameter of the crystalline body obtained in this example on its cross section perpendicular to the major axis direction, which corresponds to the crystal growth direction, was 8 mm. This size is a much larger diameter than the diameter of 4 mm of a crystalline body mentioned in Non-Patent Document 6. This is a size that can withstand practical use in applications where high current density is required, such as an electron beam welder, and specifically, a usable size of a cathode member in which any problems associated with, for example, heat resistance do not occur.

Next, the obtained crystalline body (cathode material) was subjected to microstructural observation and Electron Back Scatter Diffraction Pattern (EBSD) analysis, and X-ray powder diffraction (XRD) analysis as follows.

4. Microstructural Observation of Cathode Member

Figure 2:
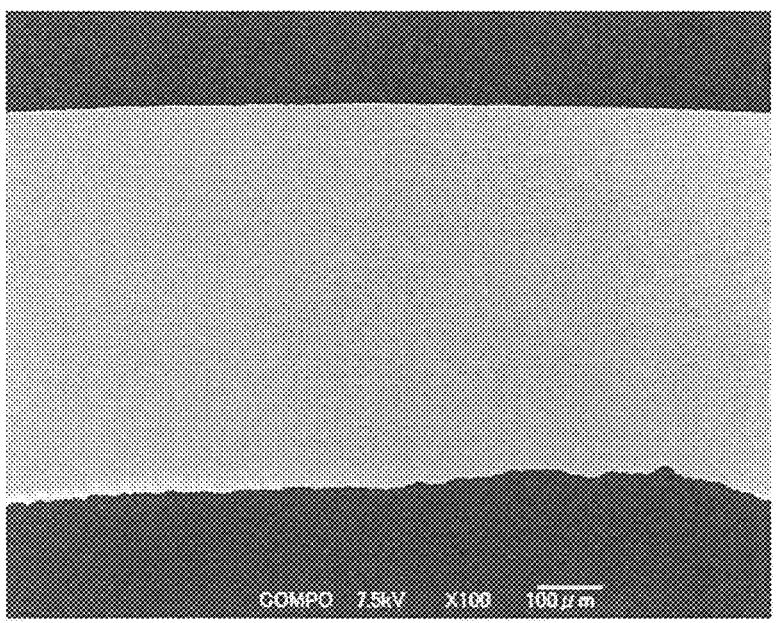
FIG. 2 shows a scanning electron microscopic observation photograph (magnification of 100 times) of the crystalline body (cathode member) in the Example.
Figure 3:
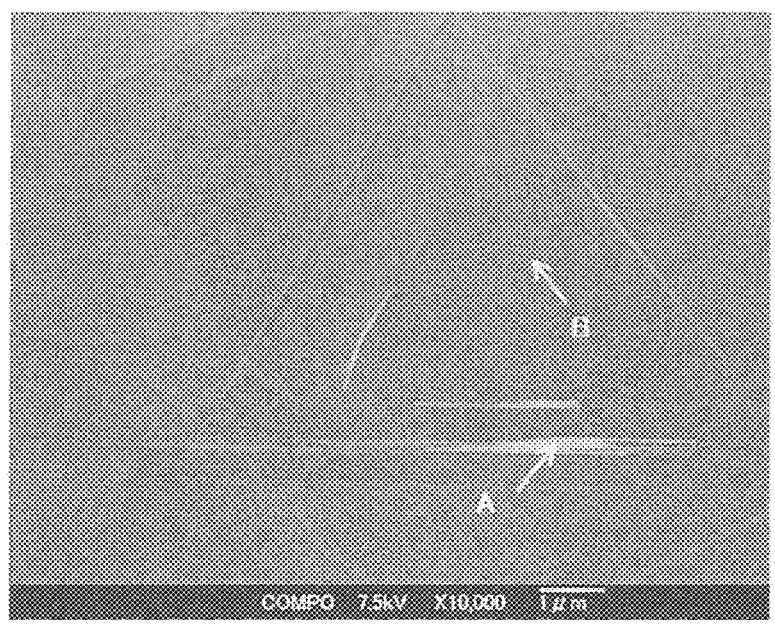
FIG. 3 shows a scanning electron microscopic observation photograph (magnification of 10,000 times) of the crystalline body (cathode member) in the Example.

The observation of the cathode member were performed with a scanning electron microscopy (SEM). The reason for the observation with the SEM is that the X-ray powder diffraction (XRD) analysis may not detect a small amount of heterogeneous and impure phases compared to the main phase (main crystal phase). In the above observation, the center of the cathode member was photographed in three fields of view with a scanning electron microscope (SEM) at the magnification of each of 100 times and 10,000 times. Among them, the SEM observation photographs taken at the magnification of 100 times and 10,000 times are shown in FIGS. 2 and 3, respectively. In this example, the EDX analysis was also performed at the respective positions indicated by reference characters A and B in FIG. 3. The results are shown in (a) and (b) of FIG. 4.

Figure 4:
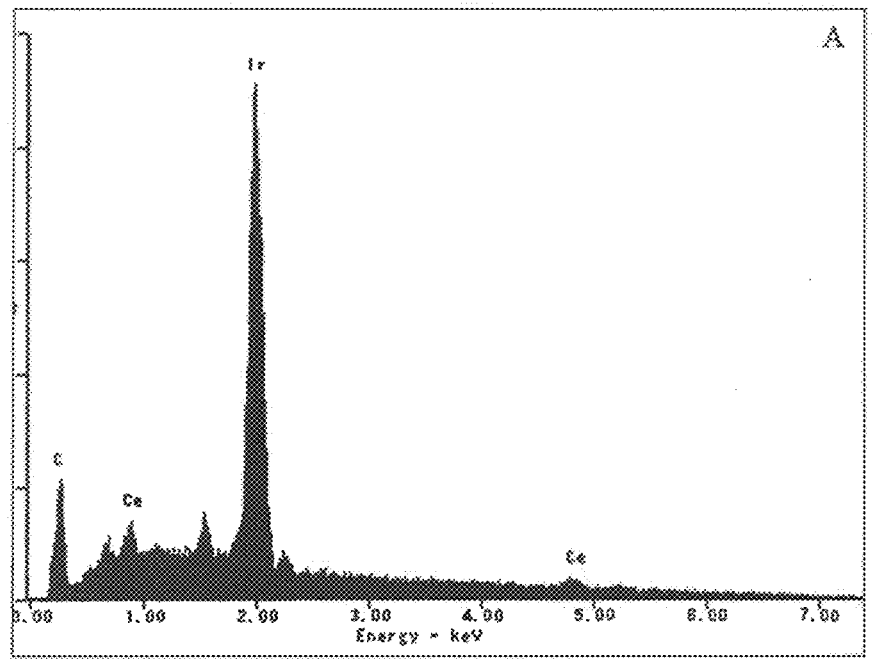
FIG. 4 shows diagrams of EDX analysis results of the crystalline body (cathode member) in the Example.
Figure 4:
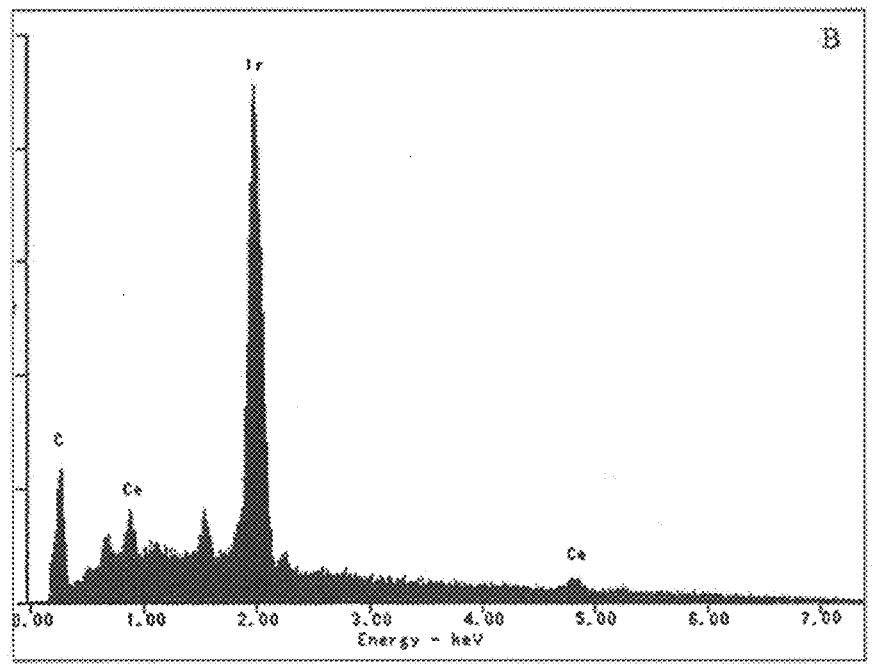

The results of FIG. 4 show that Ir and Ce were detected in both position A (white area) and position B (gray area), but there was no difference in the analysis results between these two positions. It is noted that geometric patterns can be confirmed in FIG. 3, but these are not grain boundaries. That is, from the results of FIGS. 2 to 4, it is not confirmed that there is non-uniformity in the component composition of the cathode member in the embodiments of the present invention.

In this example, from the above SEM observation photographs and the above results of the EDX analysis shown in FIG. 4, subcomponents, such as oxides with an equivalent diameter of 50 μm or less and a pure Ir phase, were not observed, with an observed area occupied by a single phase of $Ir_2Ce$. That is, in this example, the single phase of $Ir_2Ce$ occupied 95% by area or more of the observed area.

5. EBSD Analysis

Figure 5:
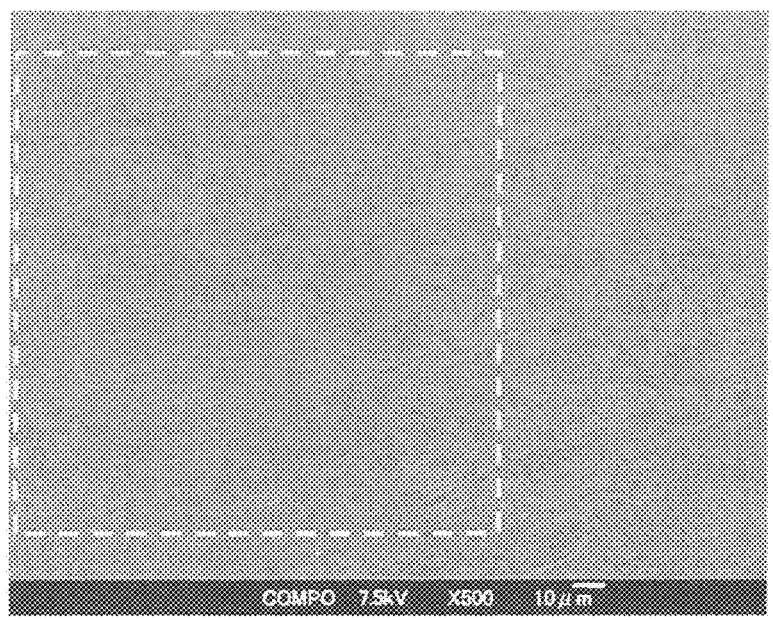
FIG. 5 is a photograph showing an EBSD analysis range of the crystalline body (cathode member) in the Example.

To confirm whether the crystal orientation in the cathode member is aligned or not, the Electron Back Scatter Diffraction (EBSD) analysis was performed. In the SEM-EBSD method, a sample set in a barrel of the FE-SEM was irradiated with electron beams. Its electron backscatter diffraction pattern was captured by the EBSD system, and thereby the sample surface was scanned at equal intervals while performing crystal orientation analysis. Thus, the EBSP at each point was obtained and indexed to determine the crystal orientation of an electron beam irradiated area. The measurement surface is Normal Direction (ND), the pull-up direction is Reference Direction (RD), and its normal direction is Transverse Direction (TD). In this example, an area (about 150 μm×about 150 μm) enclosed by the dashed line in the microscopic photograph shown in FIG. 5 was subjected to the EBSD measurement with an interval between the crystal orientation measurement points (step size) set to 0.5 μm, followed by the crystal orientation analysis using an OIM version 5 manufactured by TSL Solutions K. K., as the orientation analysis software.

Figure 6:
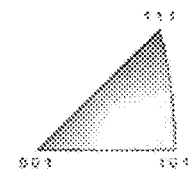
FIG. 6 is a diagram showing EBSD analysis results of the crystalline body (cathode member) in the Example.
Figure 6:
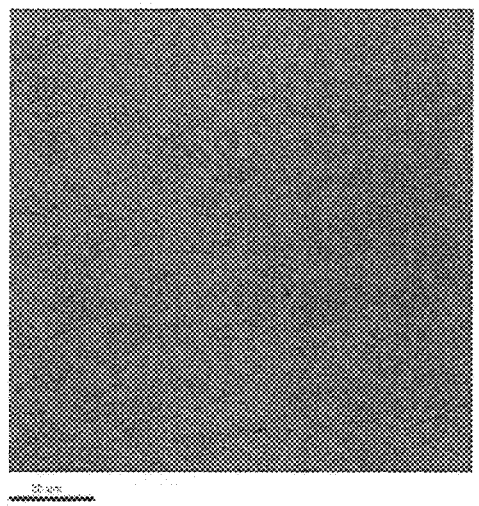
Figure 6:
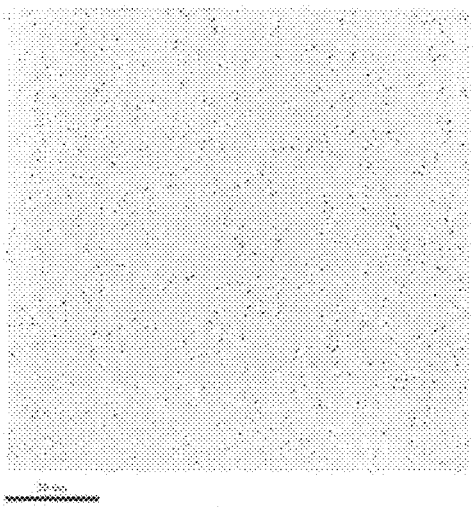
Figure 6:
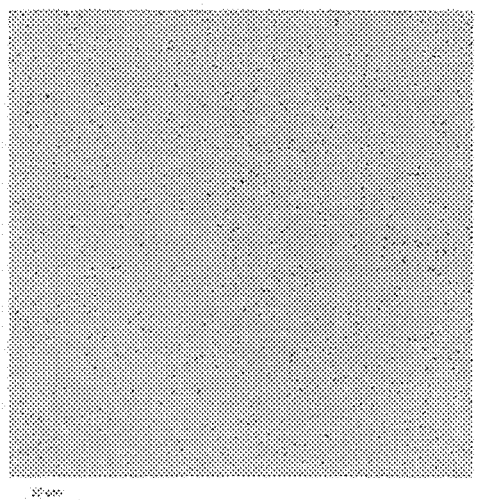
Figure 6:
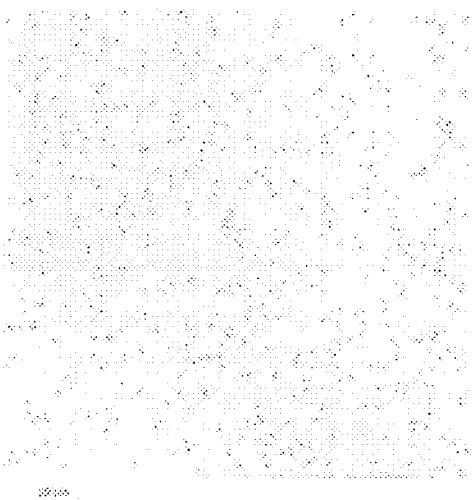

The results obtained by the above analysis are shown in FIGS. 6(a) to (d). FIG. 6(a) shows an IQ map, and FIGS. 6(b)-(d) show the ND, RD, and TD crystal orientation maps, respectively. FIGS. 6(b) to 6(d) are shown in light blue, pink, and green, respectively, in the analysis. However, in this example, it is sufficient to determine whether the analysis results shown in color or in black and white are monochromatic, indicating a single crystal.

Since each of these photographs in FIGS. 6(b)-6(d) is monochromatic, i.e., the EBSD patterns are all uniform, it is confirmed that the produced cathode member is made of a single crystal. The crystal orientation in the cathode member is aligned in this way, which contributes to favorable electron beam generation and to excellent electron emission characteristics. Black spots shown in FIGS. 6(b)-6(d) do not affect the inverse polar figure orientation map (IPF) and IQ map and are not related to the crystal orientation or subcomponents.

Figure 7:
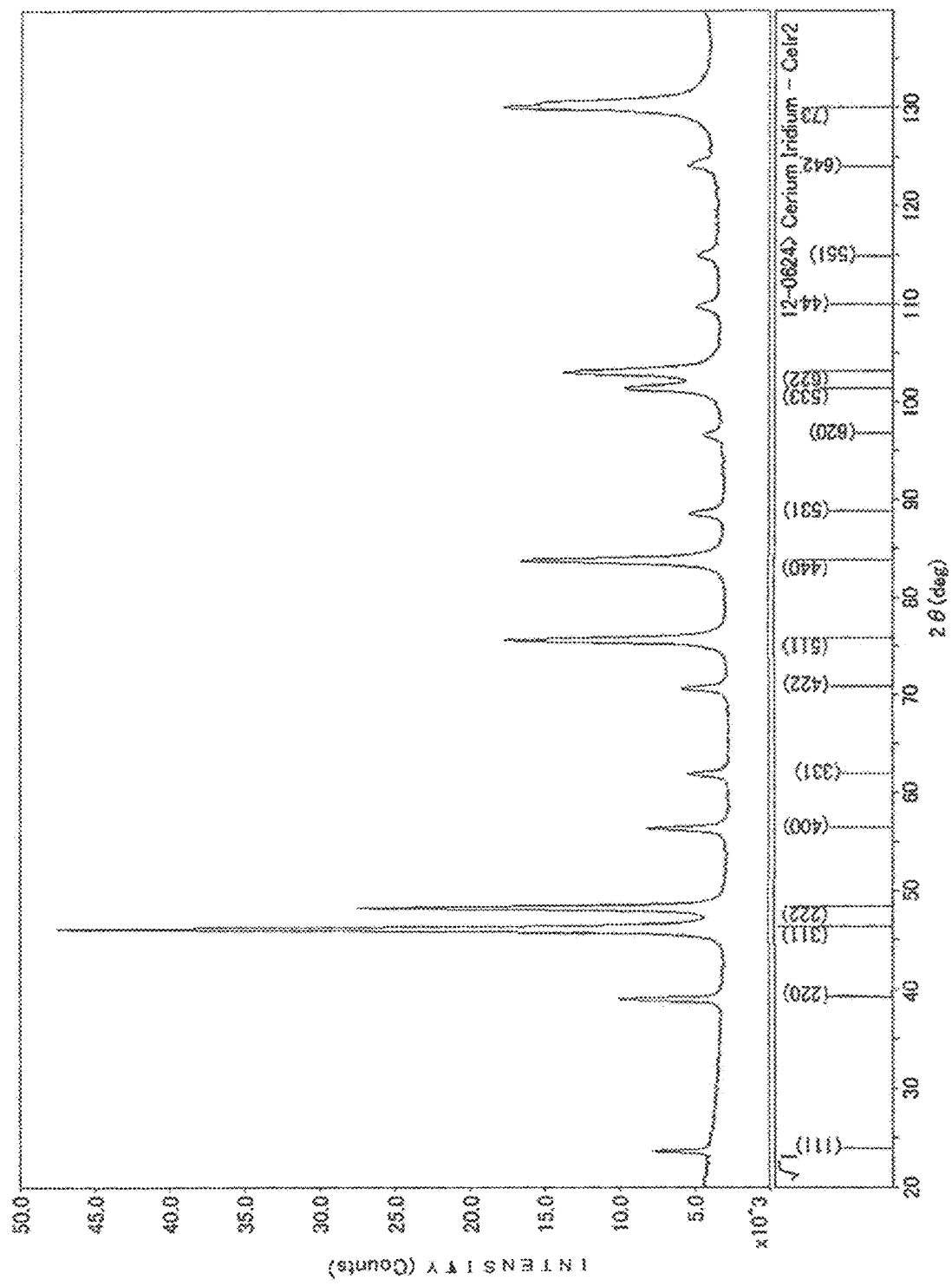
FIG. 7 is a powder X-ray diffraction (XRD) diagram of the crystalline body (cathode member) in the Example.

In order to confirm whether the desired iridium-cerium alloy was obtained in the center of the obtained cathode member, the X-ray powder diffraction (XRD) analysis was performed. The results are shown in Table 7. From FIG. 7, it was found that a single phase of $Ir_2Ce$ was obtained.

Figure 8:
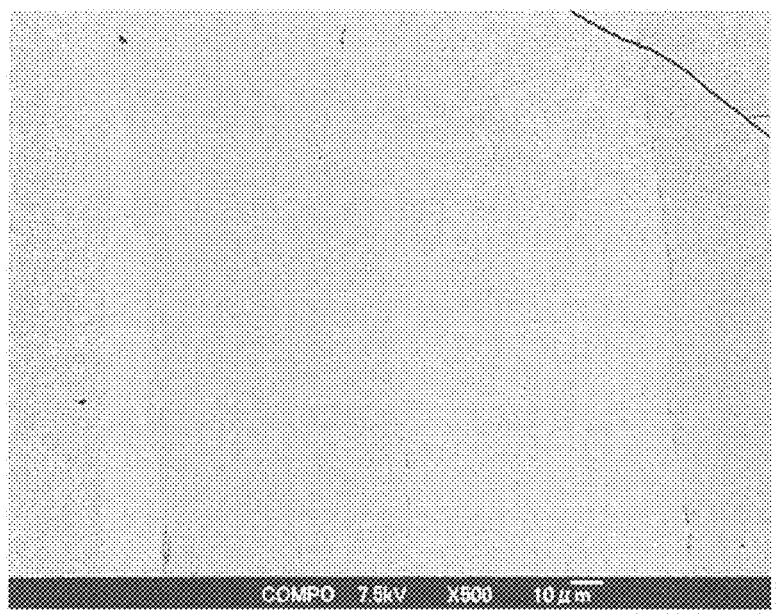
FIG. 8 shows a scanning electron microscopic observation photograph (magnification of 500 times) of the crystalline body (cathode member) in the Example.

It is noted that for reference, in this example, the crystalline body was obtained in the same way as the method mentioned above except that the FZ method was the high-frequency method. In the high-frequency method, high-frequency waves were generated by a high-frequency oscillator in an induction heating coil, thereby heating the raw material rod and melting it to produce the crystalline body. The SEM observation result thereof (magnification of 500 times) is shown in FIG. 8. In FIG. 8, the black dots and black lines are not related to any material. As shown in FIG. 8, it was confirmed that the crystal grains extended to form a columnar microstructure, and that a unidirectionally solidified material was obtained.

As shown in Non-Patent Document 6, an $Ir_2Ce$ single crystalline body was produced in a tetra arc furnace, and by checking its cross section with the scanning electron microscopy, large voids were observed. In contrast, the crystalline body obtained in this example had no voids as shown in the above SEM observation photograph.

As mentioned above, in the present example, the crystalline body in which subcomponents were suppressed sufficiently and which achieved crystal homogeneity was obtained. Particularly, the obtained crystalline body was made of a single phase and single crystal, or was solidified in one direction. Such a crystalline body can realize the cathode member for electron beam generation with excellent electron emission characteristics when used in the cathode member because it suppresses impurities, non-uniformity in the component composition, and crystal diversity, all of which may interfere with the electron emission characteristics of the cathode member.

The present application claims priority on Japanese Patent Application No. 2019-159587 filed on Sep. 2, 2019, the entire contents of which is incorporated herein by reference.

INDUSTRIAL APPLICABILITY

The cathode member for electron beam generation of the present disclosure is used as core parts of electron beam generators such as general-purpose analyzers, and can also be utilized in plasma injection acceleration applications such as electron beam melting devices, accelerators, and satellites.

The invention claimed is:

1. A cathode member for electron beam generation, comprising:
    95% by area or more of a single phase of a compound composed of iridium and cerium,
    wherein a total content of one or more subcomponents of metallic iridium and an oxide of one or more elements of iridium and cerium is 5% by area or less of the cathode member,
    wherein a crystal microstructure of the single phase is solidified in one direction or made of a single crystal, and
    wherein the cathode member does not contain voids.

2. The cathode member for electron beam generation according to claim 1, wherein the compound composed of iridium and cerium is a compound selected from a group consisting of $Ir_2Ce$, $Ir_3Ce$, and $Ir_7Ce_2$.

3. The cathode member for electron beam generation according to claim 2, wherein the single phase of $Ir_2Ce$, $Ir_3Ce$, or $Ir_7Ce_2$ occupies 95% by area or more of the cathode member.

4. The cathode member for electron beam generation according to claim 2, wherein a size of the subcomponent is 50 μm or less in circular equivalent diameter.

5. The cathode member for electron beam generation according to claim 4, wherein the single phase of $Ir_2Ce$, $Ir_3Ce$, or $Ir_7Ce_2$ occupies 95% by area or more of the cathode member.

6. A method for manufacturing the cathode member for electron beam generation according to claim 2, the method comprising:
 a melting step of melting a metallic cerium raw material and a metallic iridium raw material to obtain an ingot material;
 a pulverizing step of pulverizing the ingot material to obtain a pulverized material;
 a sintering step of sintering the pulverized material of the ingot material at a temperature of 1,400 to 1,600° C. and a pressure of 25 to 50 MPa to obtain a sintered material for fabrication of a crystalline body; and
 a crystalline body fabricating step of fabricating a crystalline body of a compound composed of iridium and cerium by a floating zone method using the sintered material for fabrication of the crystalline body.

7. The method for manufacturing the cathode member for electron beam generation according to claim 6, the method further comprising:
 a crystalline body pulverizing step of pulverizing the crystalline body to obtain a pulverized material, after the crystalline body fabricating step; and
 a sintering step of sintering the pulverized material of the crystalline body at a temperature of 1,400 to 1,600° C. and a pressure of 25 to 50 MPa to obtain a sintered material.

8. The cathode member for electron beam generation according to claim 1, wherein a size of the subcomponent is 50 μm or less in circular equivalent diameter.

9. The cathode member for electron beam generation according to claim 8, wherein the single phase of $Ir_2Ce$, $Ir_3Ce$, or $Ir_7Ce_2$ occupies 95% by area or more of the cathode member.

10. The cathode member for electron beam generation according to claim 1, wherein the compound composed of iridium and cerium is made of a single phase of $Ir_2Ce$, $Ir_3Ce$, or $Ir_7Ce_2$, and contains neither metallic iridium nor an oxide of one or more elements of iridium and cerium.

11. A method for manufacturing the cathode member for electron beam generation according to claim 1, the method comprising:
 a melting step of melting a metallic cerium raw material and a metallic iridium raw material to obtain an ingot material;
 a pulverizing step of pulverizing the ingot material to obtain a pulverized material;
 a sintering step of sintering the pulverized material of the ingot material at a temperature of 1,400 to 1,600° C. and a pressure of 25 to 50 MPa to obtain a sintered material for fabrication of a crystalline body; and
 a crystalline body fabricating step of fabricating a crystalline body of a compound composed of iridium and cerium by a floating zone method using the sintered material for fabrication of the crystalline body.

12. The method for manufacturing the cathode member for electron beam generation according to claim 11, the method further comprising:
 a crystalline body pulverizing step of pulverizing the crystalline body to obtain a pulverized material, after the crystalline body fabricating step; and
 a sintering step of sintering the pulverized material of the crystalline body at a temperature of 1,400 to 1,600° C. and a pressure of 25 to 50 MPa to obtain a sintered material.

\* \* \* \* \*